United States Patent
Yamada et al.

(10) Patent No.: US 6,278,930 B1
(45) Date of Patent: Aug. 21, 2001

(54) DEVICE FOR CONTROLLING SPIN/DRIFTOUT OF VEHICLE COMPATIBLY WITH ROLL CONTROL

(75) Inventors: Noritaka Yamada, Mishima; Akira Nagae, Susono, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/556,796

(22) Filed: Apr. 25, 2000

(30) Foreign Application Priority Data

Jun. 1, 1999 (JP) .................................................. 11-153749

(51) Int. Cl.[7] .............................. B60T 8/00; B60T 13/00; G05D 13/00; G05D 15/00; G06F 7/00; G06F 17/00; G06F 19/00

(52) U.S. Cl. ................................. 701/82; 701/70; 701/71; 701/72; 701/73; 701/74; 701/80; 701/81; 701/83; 303/100; 303/111; 303/107; 303/167; 303/140; 303/146; 303/155; 303/152; 303/157; 303/133; 303/147

(58) Field of Search ........................... 701/70–74, 80–83; 303/100, 111, 167, 107, 140, 146, 152, 155, 157, 133, 147; 180/197; 280/757, 91.1; 188/10, 2 A; 192/4 R, 9; 242/554.5, 413.1; 291/15; 369/237; 477/210

(56) References Cited

U.S. PATENT DOCUMENTS

| | | | |
|---|---|---|---|
| 4,625,933 | 12/1986 | Williams et al. | 280/707 |
| 4,803,627 | 2/1989 | Yasuike et al. | 364/424.05 |
| 4,807,128 | 2/1989 | Ikemoto et al. | 364/424.05 |
| 4,809,176 | 2/1989 | Oowa et al. | 364/424 |
| 4,898,431 | 2/1990 | Karnopp et al. | 303/100 |
| 5,016,910 | 5/1991 | Nagai | 280/707 |
| 5,134,352 | 7/1992 | Matsumoto et al. | 318/587 |
| 5,172,961 | * 12/1992 | Inoue et al. | 303/100 |
| 5,229,944 | * 7/1993 | Yasuno | 701/70 |
| 5,344,224 | * 9/1994 | Yasuno | 303/111 |
| 5,640,324 | 6/1997 | Inagaki | 364/426.01 |
| 5,673,981 | * 10/1997 | Higashimata et al. | 303/155 |

(List continued on next page.)

FOREIGN PATENT DOCUMENTS

| | | |
|---|---|---|
| 196 32 943 A1 | 2/1998 | (DE) . |
| 197 47 144 A1 | 3/1998 | (DE) . |
| 196 38 280 A1 | 6/1998 | (DE) . |
| 6-297985 | 10/1994 | (JP) . |
| 9-109851 | 4/1997 | (JP) . |
| 10-81215 | 3/1998 | (JP) . |
| 10-278762 | 10/1998 | (JP) . |

Primary Examiner—William A. Cuchlinski, Jr.
Assistant Examiner—Ronnie Mancho
(74) Attorney, Agent, or Firm—Oliff & Berridge, PLC (57) ABSTRACT

A moving behavior control device for a vehicle calculates first target braking forces to be applied to the respective wheels for stabilizing the vehicle against a turn instability, second target braking forces to be applied to the respective wheels for stabilizing the vehicle against a roll instability, and target overall braking forces to be applied to the respective wheels by integrating the first and second target braking forces, and applies braking forces to the respective wheels according to the target overall braking forces, wherein the applied braking forces are decreased according to a first rate schedule by which the applied braking forces are decreased at a first rate according to an excess of the applied braking forces relative to the target overall braking forces when the vehicle is running at no probability of rolling beyond a predetermined threshold roll, and according to a second rate schedule by which the braking forces are lowered at a second rate smaller than the first rate according to the excess when the vehicle is running at such a probability.

12 Claims, 6 Drawing Sheets

U.S. PATENT DOCUMENTS

| | | | |
|---|---|---|---|
| 5,700,073 | * 12/1997 | Hiwatashi et al. | 303/146 |
| 5,707,119 | 1/1998 | Monzaki | 303/148 |
| 5,707,120 | 1/1998 | Monzaki et al. | 303/148 |
| 5,727,853 | 3/1998 | Monzaki | 303/140 |
| 5,732,371 | 3/1998 | Fujita | 701/38 |
| 5,738,420 | 4/1998 | Kawaguchi et al. | 303/146 |
| 5,772,289 | 6/1998 | Nakazawa et al. | 303/9.69 |
| 5,816,669 | * 10/1998 | Hiwatashi et al. | 303/140 |
| 5,822,709 | 10/1998 | Fujita | 701/70 |
| 5,839,800 | * 11/1998 | Koga et al. | 303/152 |
| 5,850,616 | * 12/1998 | Matsuno et al. | 701/82 |
| 5,863,105 | * 1/1999 | Sano | 303/146 |
| 5,869,943 | 2/1999 | Nakashima et al. | 318/586 |
| 5,890,084 | 3/1999 | Halasz et al. | 701/45 |
| 5,899,952 | 5/1999 | Fukada | 701/74 |
| 5,913,578 | * 6/1999 | Tozu et al. | 303/140 |
| 5,915,800 | * 6/1999 | Hiwatashi et al. | 303/146 |
| 5,941,334 | 8/1999 | Inagaki | 180/242 |
| 5,948,027 | 9/1999 | Oliver, Jr. et al. | 701/37 |
| 5,974,221 | 10/1999 | Kato et al. | 386/68 |
| 6,002,974 | 12/1999 | Schiffmann | 701/36 |
| 6,002,975 | 12/1999 | Schiffmann et al. | 701/36 |
| 6,065,558 | 5/2000 | Wielenga | 180/282 |
| 6,074,020 | * 6/2000 | Takahashi et al. | 303/146 |
| 6,081,761 | 6/2000 | Harada et al. | 701/72 |
| 6,104,284 | 8/2000 | Otsuka | 340/440 |
| 6,139,120 | 10/2000 | Fukuda | 303/146 |
| 6,154,697 | 11/2000 | Otsuka | 701/45 |

* cited by examiner

DEVICE FOR CONTROLLING SPIN/DRIFTOUT OF VEHICLE COMPATIBLY WITH ROLL CONTROL

BACKGROUND OF THE INVENTION

1. Field of the Invention

The present invention relates to a moving behavior control device of a vehicle such as an automobile, and more particularly, to a moving behavior control device of a vehicle for controlling a turn behavior thereof against a spin or a driftout and a roll behavior thereof against an excessive rolling or a roll-over.

2. Description of the Prior Art

It is currently well known in the art of automobiles industries to improve the turn behavior of vehicles such as automobiles against a spin or a driftout or to suppress the vehicle against an excessive rolling or roll-over by applying a computer controlled braking to a selected one or more of the wheels. Further, although the spin, the driftout and the rolling of vehicles are substantially different from one another as the phenomena of the moving behavior of a vehicle, a spin control and a driftout control are often combined as a turn behavior control of the vehicles, while it will also be contemplated as a matter of principle that a roll suppress control is combined with such a turn behavior control, as all the controls depend on a computer controlled actuation of a common brake system.

SUMMARY OF THE INVENTION

However, when a roll suppress control is further combined with a spin and a driftout suppress control, since the brake system is equally faithful to all of those controls, it is anticipated that an undesirable interference occurs between the different controls according to the running conditions of the vehicle. There will be a wide variety of improvements toward such and other problems encountered in various combinations of those different controls. In this regard, a point to be noted will be that, since an interference generally demands a compromise on one or both sides for it being solved, the problem will be what is how far sacrificed.

In view of the above, it is a primary object of the present invention to provide a moving behavior control for a vehicle such as an automobile by which the vehicle is controlled against all of the spin, driftout and excessive roll with a least sacrifice of one of these controls for a stable whole moving behavior control of the vehicle.

According to the present invention, such a primary object is accomplished by a moving behavior control device for a vehicle having a vehicle body, front left, front right, rear left and rear right wheels suspended by the vehicle body, and a brake system for applying a controlled braking force to each of the wheels, the moving behavior control device comprising:

first means for calculating target braking forces to be applied to the respective wheels for stabilizing the vehicle against a turn instability thereof;

second means for calculating target braking forces to be applied to the respective wheels for stabilizing the vehicle against a roll instability thereof;

third means for calculating target overall braking forces to be applied to the respective wheels by integrating the target braking forces calculated by the first means and the target braking forces calculated by the second means with respect to the corresponding wheels;

fourth means for operating the brake system so as to apply such braking forces to the respective wheels which conform to the target overall braking forces; and fifth means for detecting the vehicle running at a probability of rolling beyond a predetermined threshold roll;

wherein the fourth means decrease the braking forces according to a first rate schedule by which the applied braking forces are decreased generally at a first rate according to an excess of the applied braking forces relative to the target overall braking forces when the fifth means do not detect the vehicle running at said probability and according to a second rate schedule by which the braking forces are lowered generally at a second rate generally smaller than the first rate according to an excess of the applied braking forces relative to the target overall braking forces when the fifth means detect the vehicle running at said probability.

As already known in the art, in order to suppress a vehicle from spinning, a front wheel serving at the outside of a turn is braked so as thereby to generate an anti-spin moment around the braked front outside wheel, while in order to suppress a vehicle from drifting out, rear wheels are braked so as to decelerate the vehicle thereby decreasing a centrifugal force acting at the vehicle, with an additional effect that the braked rear wheels will slide laterally outside of the turn. In order to suppress a vehicle from excessively rolling, a braking may also be applied to a front wheel serving at the outside of a turn and also to the rear wheels.

Therefore, when a vehicle is synthetically controlled against a spin, a driftout and an excessive roll, such that at one time a front wheel serving at the outside of a turn is braked for suppressing a spin or an excessive roll or both, while at another time the rear wheels are braked for suppressing a driftout or an excessive roll or both, there would be no serious problem in the process of increasing the braking force even if the braking is executed for a spin suppress control with no need for a roll suppress control, or vice versa, or even if the braking is executed for a driftout suppress control with no need for a roll suppress control, or vice versa. (It is very rare that a spin suppress control and a driftout suppress control are needed at the same time.)

However, the inventors anticipate some serious problems in the latter half control process of releasing the applied braking. If the braking applied for a spin or a driftout suppress control is swiftly released according to a swift subsidence of the spin or the driftout with the condition of the vehicle being not yet excessively rolled but liable to an excessive roll, the vehicle would be put into an excessive roll by the swift release of the braking before a roll suppress control is newly actuated.

The moving behavior control device of the above-mentioned construction meets with such a problem with a least sacrifice that the release of the braking for a spin suppress control or a driftout suppress control is somewhat slowed down when there is a probability of inducing an excessive roll by the release, only after the regular braking for the spin suppress control or the driftout suppress control has been effected.

In the above-mentioned moving behavior control device, the fifth means may detect the vehicle running at said probability when a lateral acceleration lager than a predetermined threshold value is acting at the vehicle.

Or, the fifth means may detect the vehicle running at said probability when the vehicle is yawing at a yaw rate lager than a predetermined threshold value.

Or, the fifth means may detect the vehicle running at said probability when a weighted sum of a lateral acceleration acting at the vehicle and a roll angular velocity of the vehicle body is lager than a predetermined threshold value.

The moving behavior control device according to the present invention may further be so constructed that the fourth means increase the braking forces according to a third rate schedule by which the applied braking forces are increased generally at a third rate according to a shortage of the applied braking forces relative to the target overall braking forces when the fifth means do not detect the vehicle running at said probability and according to a fourth rate schedule by which the applied braking forces are increased generaly at a fourth rate generally smaller than the third rate according to a shortage of the applied braking forces relative to the target overall braking forces when the fifth means detect the vehicle running at said probability.

The above-mentioned first rate schedule may show such a performance that the braking force decreasing rate is substantially constant at a first rate value against decrease of the excess of the applied braking forces relative to the target overall braking forces until the excess decreases down to a first excess value and then decreases substantially monotonously along with further decrease of the excess, while the second rate schedule shows such a performance that the braking force decreasing rate is substantially constant at a second rate value substantially smaller than the first rate value until the excess decreases down to a second excess value substantially smaller than the first excess value and then decreases substantially monotonously along with further decrease of the excess.

Similarly, the above-mentioned the third rate schedule may show such a performance that the braking force increasing rate increases substantially monotonously up to a third rate value along with increase of the shortage of the applied braking forces relative to the target overall braking forces until the shortage increases up to a first shortage value and then is substantially constant at the third rate value against further increase of the shortage, while the fourth rate schedule shows such a performance that the braking force increasing rate increases substantially monotonously up to a fourth rate value substantially smaller than the third rate value along with increase of the shortage of the applied braking forces relative to the target overall braking forces until the shortage increases up to a second shortage value and then is substantially constant at the fourth rate value against further increase of the shortage.

Or, as a modification, the first rate schedule may shows such a performance that the braking force decreasing rate is substantially constant at a fifth rate value against decrease of the excess of the applied braking forces relative to the target overall braking forces until the excess decreases down to a third excess value and then decreases substantially monotonously at a first monotonously decreasing rate along with further decrease of the excess, while the second rate schedule shows such a performance that the braking force decreasing rate decreases substantially monotonously at a second monotonously decreasing rate substantially smaller than the first substantially monotonously decreasing rate down to a sixth rate value substantially smaller than the fifth rate value along with decrease of the excess of the applied braking forces relative to the target overall braking forces until the excess decreases down to a fourth excess value and then decreases substantially monotonously at a third monotonously decreasing rate substantially equal to the first monotonously decreasing rate along with further decrease of the excess.

Similarly, as a modification, the third rate schedule may show such a performance that the braking force increasing rate increases substantially monotonously at a first monotonously increasing rate up to a seventh rate value along with increase of the shortage of the applied braking forces relative to the target overall braking forces until the shortage increases up to a third shortage value and then is substantially constant at the seventh rate value against further increase of the shortage, while the fourth rate schedule shows such a performance that the braking force increasing rate increases substantially monotonously at a second monotonously increasing rate substantially equal to the first monotonously increasing rate up to an eighth rate value substantially smaller than the seventh rate value along with increase of the shortage of the applied braking forces relative to the target overall braking forces until the shortage increases up to a fourth shortage value substantially smaller than the third shortage value and then monotonously increases at a third monotonously increasing rate substantially smaller than the first monotonously increasing rate along with further increase of the shortage.

BRIEF DESCRIPTION OF THE DRAWINGS

In the accompanying drawings.

DESCRIPTION OF THE EMBODIMENTS

In the following, the present invention will be described in more detail in the form of some preferred embodiments with reference to the accompanying drawings.

Figure 1:
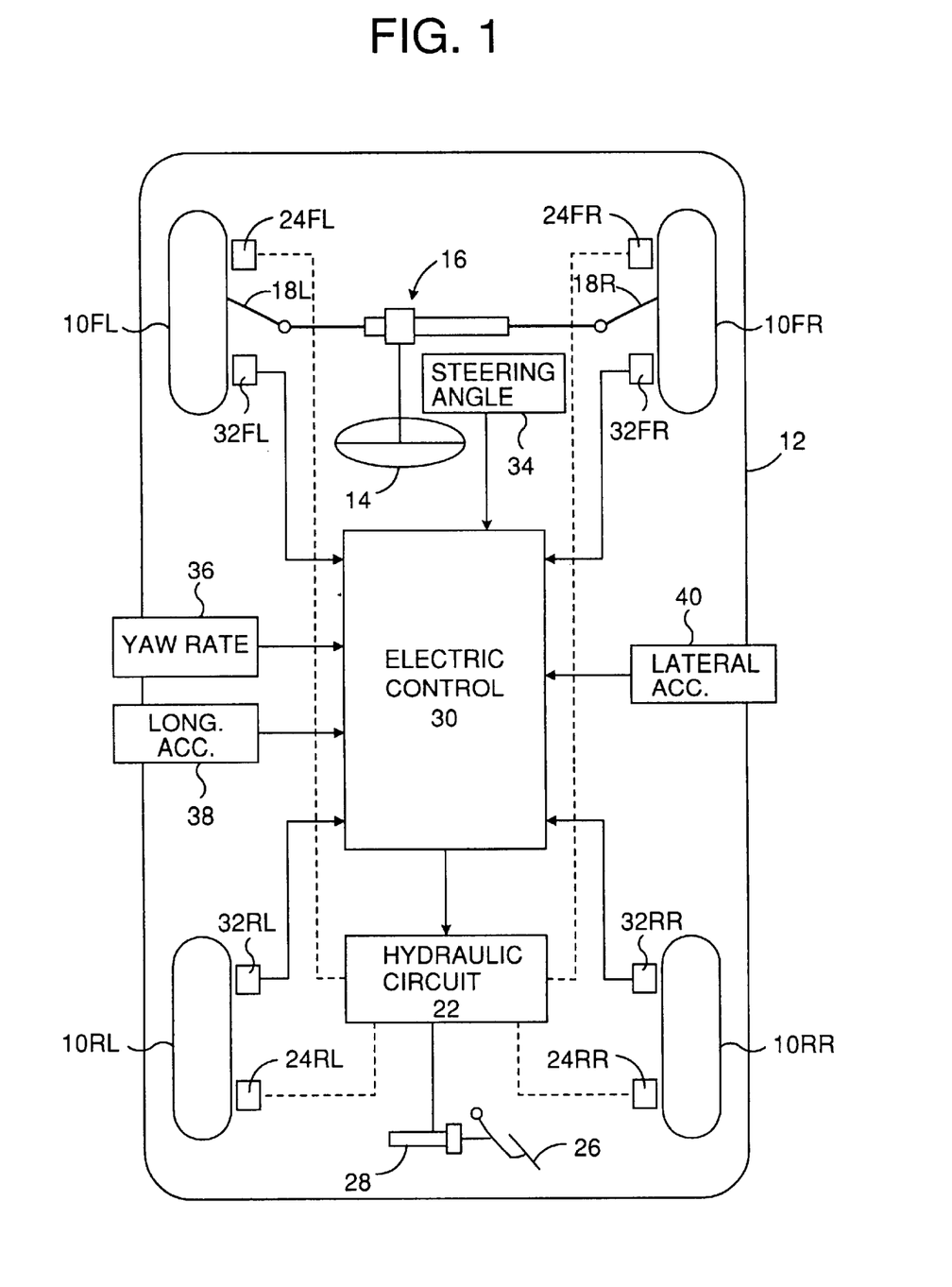
FIG. 1 is a diagrammatical illustration of a four wheeled vehicle such as an ordinary automobile in which the present invention is incorporated.

Referring to FIG. 1, the vehicle herein shown has front left, front right, rear left and rear right wheels 10FL, 10FR, 10RL and 10RR suspended from a vehicle body 12. The front left and front right wheels 10FL and 10FR are steered by a steering system including a steering wheel 14, a rack-and-pinion assembly 16, and left and right connecting rods 18L and 18R. The rear wheels 10RL and 10RR are driven by a drive system not shown in the figure. The four wheels 10FL–10RR are separately braked by their wheel cylinders 24FL, 24FR, 24RL and 24RR being supplied with a hydraulic pressure from a hydraulic circuit 22 according to a depression of a brake pedal 26 by a driver actuating a master cylinder 28 or according to a calculation and control operation of electric control means 30 including a microcomputer.

The electric control means 30 are supplied with signals indicating various motion parameters of the vehicle such as wheel rotation speeds of the respective wheels 10FL–10RR from wheel speed sensors 32FL, 32FR, 32RL and 32RR, steering angle from a steering angle sensor 34, yaw rate of the vehicle from a yaw rate sensor 36, longitudinal acceleration of the vehicle from a longitudinal acceleration sensor 38, and lateral acceleration of the vehicle from a lateral acceleration sensor 40.

The moving behavior control device according to the present invention is essentially incorporated in the electric control means 30, so as to receive such motion parameters of the vehicle as described above, to conduct certain control calculations as described hereinbelow, and to operate the brake system through the hydraulic circuit 22 for applying a controlled braking force to each of the wheels, thereby accomplishing certain moving behavior control of the vehicle according to the device of the present invention.

In the following, an embodiment of the moving behavior control device according to the present invention will be described in the form of its operation with reference to FIGS. 2–9.

Figure 2:
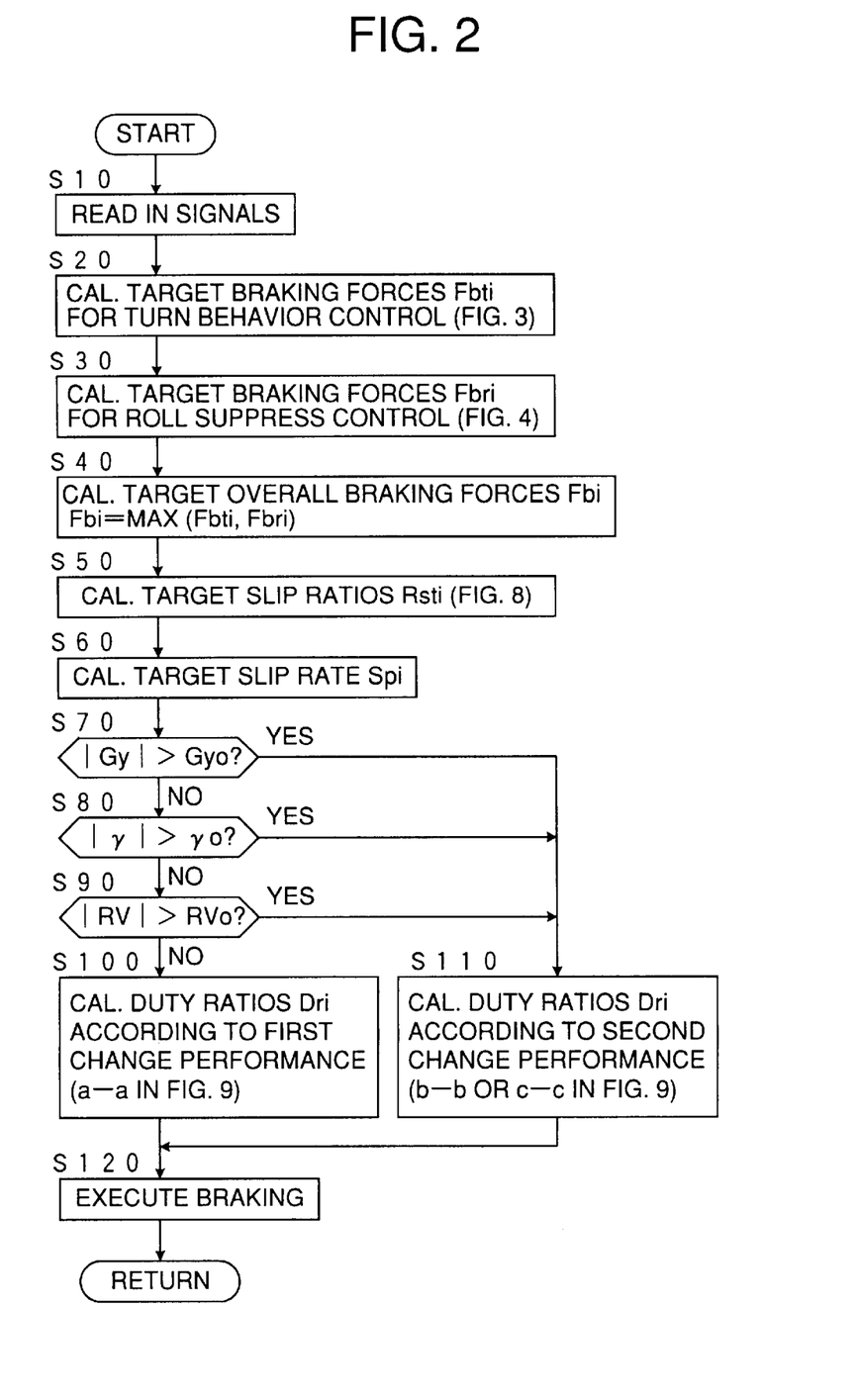
FIG. 2 is a flowchart showing an embodiment of the movement behavior control device according to the present invention in the form of the operation thereof.

Referring to FIG. 2, when the moving behavior control device is started for operation by a closure of an ignition switch (not shown) of the vehicle, in step 10, signals are read in from those sensors described above.

Figure 3:
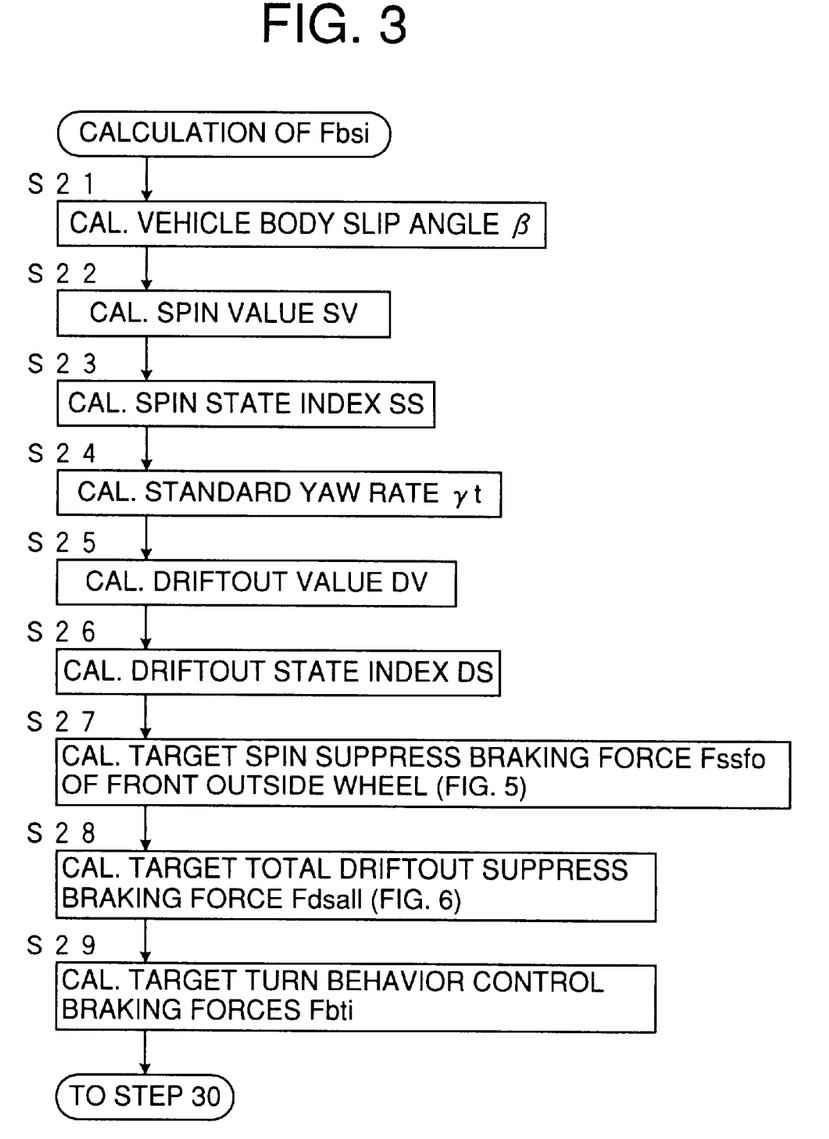
FIG. 3 is a flowchart of a subroutine carried out in step 20 of the flowchart of FIG. 2.

In step 20, target turn behavior control braking forces Fbti (i=fl, fr, rl and rr) of the front left, front right, rear left and rear right wheels for a turn behavior control are calculated according to the flowchart shown in FIG. 3. For the convenience of explaining the invention, the turn behavior control will be herein described.

Referring to FIG. 3, in step 21, vehicle body slip angle $\beta$ is calculated. The slip angle $\beta$ of the vehicle body is obtained as a ratio of side slip velocity Vy to longitudinal velocity Vx of the vehicle, such as $\beta=Vy/Vx$. The side slide velocity Vy is obtained by first calculating side slide acceleration Vyd of the vehicle as a difference between the lateral acceleration Gy detected by the lateral acceleration sensor 40 and a product of the yaw rate $\gamma$ detected by the yaw rate sensor 36 and vehicle speed V detected by the wheel speed sensors 32fl–32rr, such as $Vyd=Gy-\gamma V$, and then integrating Vyd on time basis. The longitudinal velocity Vx of the vehicle body may be the same as the vehicle speed V. Since the values of Gy and $\gamma$ are each generally made positive or negative according to whether the vehicle is turning to the left or the right, the values of Vyd and $\beta$ are normally positive when the vehicle is turning to the left, while they are normally negative when the vehicle is turning to the right.

In step 22, a parameter herein called spin value SV is calculated such as to be $SV=K_1\beta+K_2 Vyd$ by taking appropriate proportioning factors $K_1$ and $K_2$, as a parameter indicating a liability of the vehicle to spin.

In step 23, a parameter herein called spin state index SS is calculated to be SV when the vehicle is making a left turn with the value of SV being positive, while SS is made zero when the vehicle is making a left turn with the value of SV being negative. Similarly, SS is calculated to be −SV when the vehicle is making a right turn with the value of SV being negative, while SS is made zero when the vehicle is making a right turn with the value of SV being positive. Thus, the parameter SS indicates the degree of the normal liability of the vehicle to spin always in a positive value.

In step 24, standard yaw rate $\gamma t$ is calculated from the steering angle $\theta$ detected by the steering angle sensor 34, the vehicle speed V, wheel base H of the vehicle, and an appropriate stability factor Kh as follows:

$$\gamma e = V\theta/(1+KhV^2)H$$

$$\gamma t = \gamma e/(1+Ts)$$

In the above, T is a time constant for a transitional performance of the yaw rate and s is the composite variable for the Laplace transformation.

In step 25, a parameter indicating a liability of the vehicle to drift out and herein called driftout value DV is calculated as a difference between the standard yaw rate $\gamma t$ and the actual yaw rate $\gamma$ detected by the yaw rate sensor 36, as follows:

$$DV=\gamma t-\gamma$$

or, by further incorporating the wheel base H and the vehicle speed V, as follows:

$$DV=H(\gamma t-\gamma)/V$$

In step 26, a parameter herein called driftout state index DS is calculated to be DV when the vehicle is making a left turn with the value of DV being positive, while DS is made zero when the vehicle is making a left turn with the value of DV being negative. Similarly, DS is calculated to be −DV when the vehicle is making a right turn with the value of DV being negative, while DS is made zero when the vehicle is making a right turn with the value of DV being positive. The parameter DS indicates the degree of the normal liability of the vehicle to drift out always in a positive value.

Figure 5:
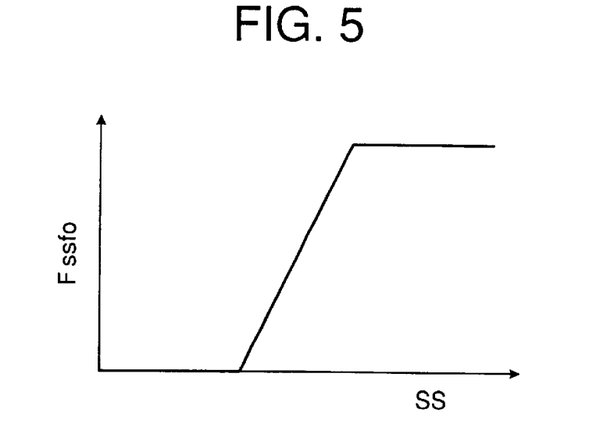
FIG. 5 is a graph showing an example of the performance of a target spin suppress braking force Fssfo against a spin state indicating parameter herein called spin state index SS.

In step 27, target spin suppress braking force Fssfo to be applied to a front wheel serving at the outside of a turn is calculated based upon the spin state index SS by looking at a map such as shown in FIG. 5.

Figure 6:
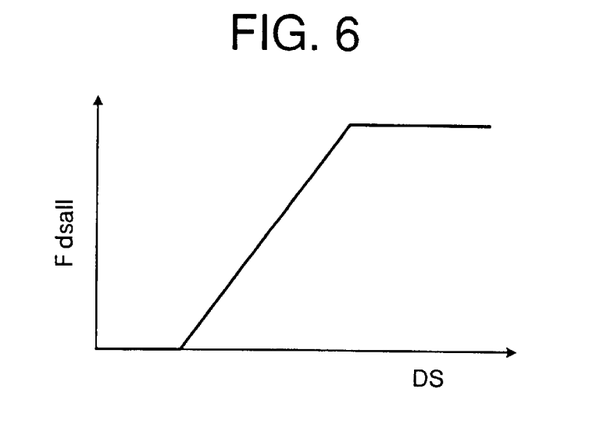
FIG. 6 is a graph showing an example of the performance of a target driftout suppress braking force Fdsall against a driftout state indicating parameter herein called driftout state index DS.

In step 28, target total driftout suppress braking force Fdsall to be applied to the wheels as a whole is calculated based upon the driftout state index DS by looking at a map such as shown in FIG. 6.

In step 29, the target turn behavior control braking forces Fbti are calculated for the four wheels according to whether the vehicle is making a left turn or a right turn, as follows:

For a left turn:

$$Fbtfl=0$$

$$Fbtfr=Fssfo$$

$$Fbtrl=(Fsall-Fssfo)Kd$$

$$Fbtrr=(Fsall-Fssfo)(1-Kd)$$

For a right turn:

$$Fbtfl=Fssfo$$

$$Fbtfr=0$$

$$Fbtrl=(Fsall-Fssfo)(1-Kd)$$

$$Fbtrr=(Fsall-Fssfo)Kd$$

In the above, Kd is a ratio for distributing the braking force (Fsall−Fssfo) to be applied to the pair of rear wheels to the rear wheel serving at the inside of the turn relative to the front wheels. Since the braking at the rear wheel serving at the inside of a turn has an effect of generating a turn assist yaw moment in the vehicle in addition to the effect of suppressing the driftout by decelerating the vehicle, it will be generally desirable that the ratio Kd is set up to be lager than 0.5.

Figure 4:
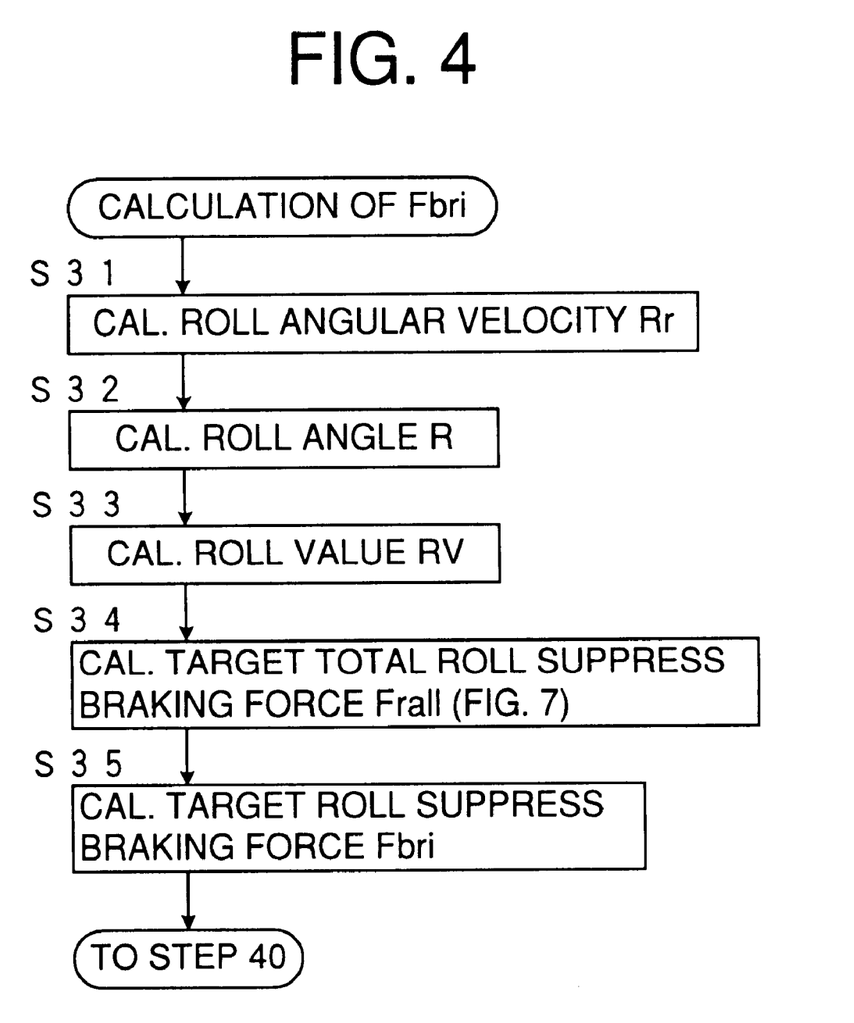
FIG. 4 is flowchart of a subroutine carried out in step 30 of the flowchart of FIG. 2.

Returning to the flowchart of FIG. 2, in step 30, target braking forces Fbri (i=fl, fr, rl and rr) of the front left, front right, rear left and rear right wheels for a roll suppress control are calculated according to the flowchart shown in FIG. 4. Also for the convenience of explaining the invention, the roll suppress control will be herein described.

Referring to FIG. 4, in step 31, roll angular velocity Rr of the vehicle body is calculated based upon natural roll frequency ωo of the vehicle body, static roll angle φo of the vehicle body per a unit lateral acceleration acting at the center of gravity of the vehicle body, and roll damping factor ξ of the vehicle body, by denoting roll angle as R and the cycle time of the control calculation through the flowchart of FIG. 2 as ΔT, respectively:

$$Rr \leftarrow Rr + |(\omega o^2 (Gy\phi o - R) - 2\omega o \xi Rr| \Delta T$$

The initial values of Rr and R may be appropriately set up. Then, in step 32, the roll angle R is calculated by integrating Rr on time basis such as:

$$R \leftarrow R + Rr\Delta T$$

The values of Rr and R are made positive or negative according to whether the vehicle is rolling clockwise or counter-clockwise as viewed from the rear of the vehicle.

In step 33, a parameter indicating an excessiveness of rolling and/or a liability of the vehicle body to roll-over and herein called roll value RV is calculated based upon the lateral acceleration Gy detected by the lateral acceleration sensor 40 and the roll angular velocity Rr calculated in step 31 by setting up appropriate limit values Gylim and Rrlim for the lateral acceleration and the roll angular velocity, respectively, as follows:

$$RV = Gy/Gylim + Rr/Rrlim$$

Figure 7:
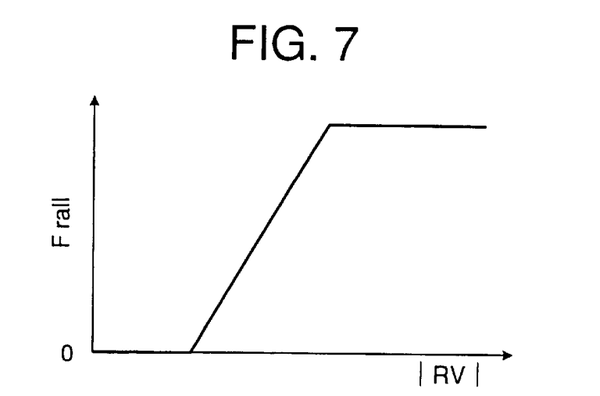
FIG. 7 is a graph showing an example of the performance of a roll suppress braking force Frall against the absolute value of a roll state indicating parameter herein called roll value RV.

In step 34, target total roll suppress braking force Frall is calculated based upon the absolute value of RV by looking at a map such as shown in FIG. 7. The target total roll suppress braking force Frall is a braking force to be applied to the vehicle as a whole for suppressing a rolling of the vehicle body.

In step 35, the target roll suppress control braking forces Fbri are calculated for the four wheels according to whether the vehicle is making a left turn or a right turn, as follows:

For a left turn:

$$Fbrfl = 0$$

$$Fbrfr = Frall \cdot Kr_1$$

$$Fbrrl = Frall(1-Kr_1)Kr_2$$

$$Fbrrr = Frall(1-Kr_1)(1-Kr_2)$$

For a right turn:

$$Fbrfl = Frall \cdot Kr_1$$

$$Fbrfr = 0$$

$$Fbrrl = Frall(1-Kr_1)(1-Kr_2)$$

$$Fbrrr = Frall(1-Kr_1)Kr_2$$

In the above, $Kr_1$ is a ratio for distributing the braking force Frall to the pair of front wheels, indeed a front wheel serving at the outside of a turn, relative to the rear wheels, and $Kr_2$ is a ratio for distributing the braking force Frall $(1-Kr_1)$ to be applied to the pair of rear wheels to a rear wheel serving at the outside of the turn. Since the braking at the rear wheel serving at the outside of a turn has an effect of suppressing a rolling of the vehicle body by increasing the radius of turn of the vehicle in addition to the effect of suppressing the rolling by decelerating the vehicle, it will be generally desirable that the ratio $Kr_2$ is set up to be lager than 0.5.

Now, returning again to the flowchart of FIG. 2, in step 40, target overall braking forces Fbi (i=fl, fr, rl and rr) for the four wheels are calculated based upon the target braking forces Fbti for the turn behavior control calculated in step 20 and the target braking forces Fbri for the roll suppress control calculated in step 30 such that the target overall braking force Fbi at each wheel is the lager of the corresponding target turn behavior control braking force Fbti and the corresponding target roll suppress control braking force Fbri. By this arrangement, a control is available for a vehicle such that the vehicle is suppressed against a spin and/or a driftout as well as against an excessive rolling or roll-out with a harmonization of the turn behavior control and the roll suppress control.

In more detail, as will be appreciated from the distribution of the braking forces Fbti and Fbri among the four wheels, the spin suppress control is common with the roll suppress control in applying a braking force substantially to a front wheel serving at the outside of a turn, thereby increasing the radius of the turn which has an effect of suppressing a spinning as well as a rolling, while the driftout suppress control is common with the roll suppress control in applying a braking force substantially to the rear wheels, thereby decelerating the vehicle speed which has an effect of suppressing a driftout as well as a rolling.

Therefore, with respect to a front wheel serving at the outside of a turn, the wheel may be braked at such a braking force that depends on a liability of the vehicle to a spin when the vehicle is only liable to spin, or on a liability of the vehicle to an excessive rolling or roll-out when the vehicle is only liable to excessively roll, or on a larger one of such two liabilities when the vehicle is liable to spin and also to excessively roll.

With respect to the rear wheels, they may be braked at such braking forces that depend on a liability of the vehicle to drift out when the vehicle is only liable to drift out with desirably a larger distribution ratio of the braking force to a rear wheel serving at the inside of a turn, or on a liability of the vehicle to excessive roll or roll out when the vehicle is only liable to excessively roll with desirably a larger distribution ratio of the braking force to a rear wheel serving at the outside of a turn, or on a larger one of such two liabilities when the vehicle is liable to drift out and also to excessively roll.

Figure 8:
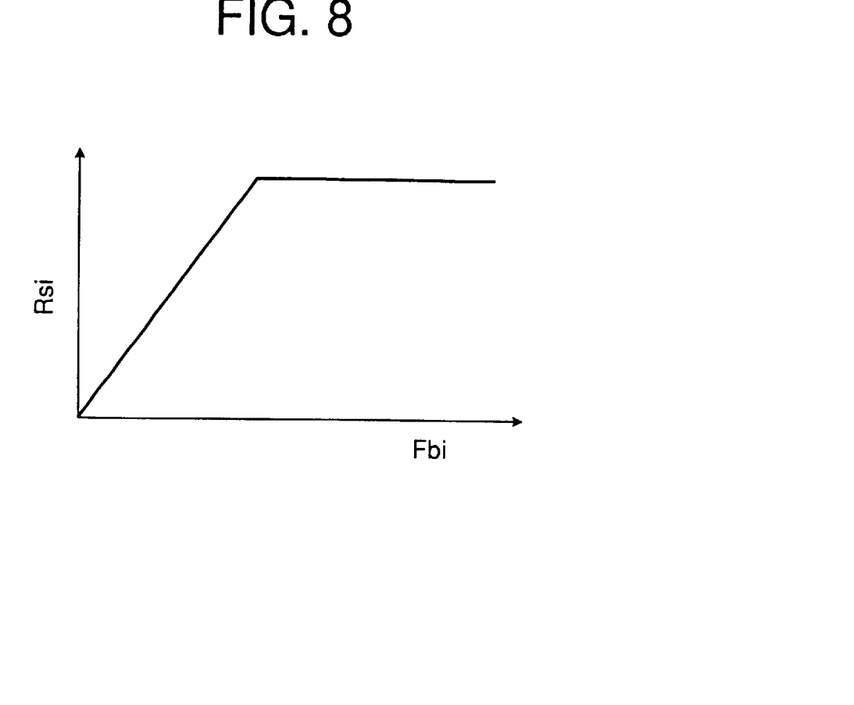
FIG. 8 is a graph showing an example of the performance of target slip ratios Rsi against target overall braking forces Fbi.

In step 50, target slip ratios Rsi (i=fl, fr, rl and rr) of the respective wheels for generating the corresponding target braking forces Fbi are calculated by looking at a map such as shown in FIG. 8.

In step 60, by target slip rates Spi of the respective wheels are calculated based upon the target slip ratios Rsi as follows:

$$Vwti = Vwb(1-Rsi)$$

$$Spi = (Vwi - Vwti)/Vwti$$

or more precisely $$Spi = \{Vwi - Vwti + Ks(Vwdi - Gx)\}/Vwti$$

In the above, Vwti are target wheel speeds of the respective wheels, Vwb is a reference wheel speed representing the overall vehicle speed (may be substituted for by the wheel speed of a front wheel serving at the inside of a turn), Vwi are actual wheel speeds detected by the wheel speed sensors 32FL–32RR, Vwdi are change rates of Vwi, and Gx is the longitudinal acceleration of the vehicle detected by the longitudinal sensor 38. By the control parameters calculated as the target braking forces Fbi being thus converted into the slip rates Spi incorporating the actual wheels speeds Vwi, the brake control for the turn behavior and roll suppress controls is stabilized by the feedback through the actual performance of the vehicle.

In step 70, it is judged if the absolute value of the lateral acceleration Gy detected by the lateral acceleration sensor 40 is larger than a threshold value Gyo predetermined therefor. The threshold value Gyo is such a value of the lateral acceleration acting at the vehicle body above which the moving behavior control device according to the present invention is modified in contrast to otherwise as described in detail hereinbelow. When the answer is no, the control proceeds to step 80, while when the answer is yes, the control proceeds to step 110.

In step 80, it is judged if the absolute value of the yaw rate γ detected by the yaw rate sensor 36 is larger than a threshold value γo predetermined therefor. The threshold value γo is also such a value of the yaw rate occurring in the vehicle body above which the moving behavior control device according to the present invention is modified in contrast to otherwise as described in detail hereinbelow. When the answer is no, the control proceeds to step 90, while when the answer is yes, the control proceeds to step 110.

In step 90, it is judged if the absolute value of the roll value RV calculated in step 33 of FIG. 4 is larger than a threshold value RVo predetermined therefor. The threshold value RVo is also such a value of the roll value above which the moving behavior control device according to the present invention is modified in contrast to otherwise as described in detail hereinbelow. When the answer is no, the control proceeds to step 100, while when the answer is yes, the control proceeds to step 110.

All of the judgments of steps 70, 80 and 90 can indicate a probability that the roll suppress control is being carried out at a relatively high level by the moving behavior control device of the present invention. In other words, when either of the answers of these steps is yes, it is contemplated that the moving behavior control according to the present invention which integrates the turn behavior control based upon the target braking forces Fbti calculated in step 20 and the roll suppress control based upon the target roll suppress braking forces Fbri calculated in step 30 such that the larger of Fbti and Fbri are use for the respective wheels, should better be deliberately carried out.

In this connection, it will be appreciated that, although in the above, the three steps of judgments are made by steps 70, 80 and 90 for selecting either step 100 or 110, the judgment for such a selection may be made by only one or two of these steps according to the modes of embodiment of the invention.

Figure 9:
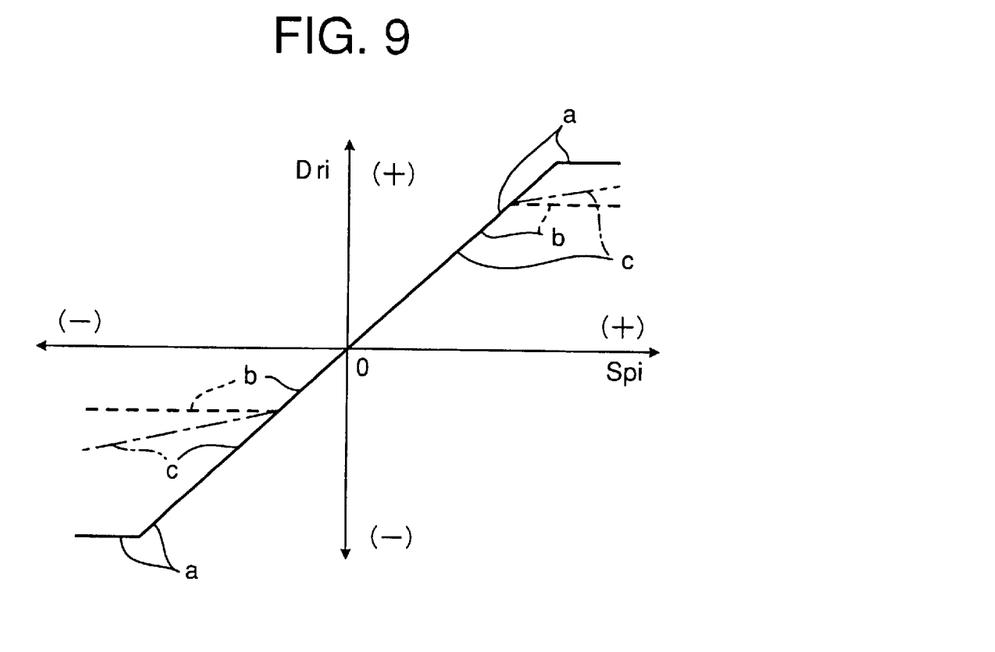
FIG. 9 is a graph showing several variations with regard to the operation performance of the embodiment shown in FIGS. 2–4.

In any event, in step 100, duty ratios Dri (i=fl, fr, rl and rr) for increasing or decreasing the hydraulic pressure of the respective wheel cylinders 24FL, 24FR, 24RL and 24RR are calculated based upon the target slip rates Spi by looking at a map such as shown in FIG. 9, with respect to such a performance as shown by a solid line a—a.

Although not shown in FIG. 1 in detail, the hydraulic circuit 22 includes a hydraulic pressure source composed of a pump or a pump-and-accumulator, and four sets of inlet and outlet valves, the inlet valve of each such set being adapted to supply the hydraulic pressure from the hydraulic pressure source to a corresponding one of the wheel cylinders 24FL–24RR when opened, while the outlet valve of each such set being adapted to exhaust the hydraulic pressure of the corresponding wheel cylinder toward an oil reservoir when opened. These inlet and outlet valves are each generally a normally closed valve and are cyclically opened at a frequency when required. A positive value of the duty ratio Dri is a ratio of the opening period of the inlet valve to such a cycle period, while a negative value of the duty Dri is a ratio of the opening period of the outlet valve to such a cycle period. Thus, when a certain wheel is braked for a certain period for a turn behavior control and/or a roll suppress control, first the corresponding inlet valve is cyclically opened for a varying duration corresponding to a positive value of the duty ratio Dri according to a target slip rate Spi for the wheel, and then thereafter, when the braking of the certain wheel is released, the corresponding outlet valve is cyclically opened for a varying duration corresponding to a negative value of the duty ratio Dri according to a target slip ratio Psi for the wheel.

When the control has proceeded to step 110, the performance of Dri relative to Spi is modified as exemplarily shown by a broken line b—b or a two dots dash line c—c. As will be appreciated from such modifications of the performance curve, when a more deliberate increase and decrease of the braking forces applied to the respective wheels for the moving behavior control are considered to be desirable, the absolute values of the duty ratios Dri relative to the variations of the target slip rates Spi are more restricted than in step 100. In this connection, it will be further appreciated that the moderation of the change rate of the braking forces is more emphasized for the releasing of the braking force than for the supplying thereof, so as to avoid a further rolling being induced by a too quick release of a turn behavior control.

As a further modification, the performance of Dri vs. Spi in the negative quadrant may be so made that the value of Dri is a constant negative value by a relatively small absolute value regardless of changes of Spi.

Although the present invention has been described in detail with respect to some preferred embodiments thereof, it will be apparent for those skilled in the art that various modifications are possible with respect to the shown embodiments within the scope of the present invention.

What is claimed is:

1. A moving behavior control device for a vehicle having a vehicle body, front left, front right, rear left and rear right wheels suspended by the vehicle body, and a brake system for applying a controlled braking force to each of the wheels, the moving behavior control device comprising:

first means for calculating target braking forces to be applied to the respective wheels for stabilizing the vehicle against a turn instability thereof;

second means for calculating target braking forces to be applied to the respective wheels for stabilizing the vehicle against a roll instability thereof;

third means for calculating target overall braking forces to be applied to the respective wheels by integrating the target braking forces calculated by the first means and the target braking forces calculated by the second means with respect to the corresponding wheels;

fourth means for operating the brake system so as to apply such braking forces to the respective wheels that conform to the target overall braking forces; and fifth means for detecting the vehicle running at a probability of rolling beyond a predetermined threshold roll;

wherein the fourth means decrease the braking forces according to a first rate schedule by which the applied braking forces are decreased generally at a first rate according to an excess of the applied braking forces relative to the target overall braking forces when the fifth means do not detect the vehicle running at said probability and according to a second rate schedule by which the braking forces are lowered generally at a second rate generally smaller than the first rate according to an excess of the applied braking forces relative to the target overall braking forces when the fifth means detect the vehicle running at said probability.

2. A moving behavior control device according to claim 1, wherein the fifth means detect the vehicle running at said probability when a lateral acceleration lager than a predetermined threshold value is acting at the vehicle.

3. A moving behavior control device according to claim 1, wherein the fifth means detect the vehicle running at said probability when the vehicle is yawing at a yaw rate lager than a predetermined threshold value.

4. A moving behavior control device according to claim 1, wherein the fifth means detect the vehicle running at said probability when a weighted sum of a lateral acceleration acting at the vehicle and a roll angular velocity of the vehicle body is lager than a predetermined threshold value.

5. A moving behavior control device according to claim 1, wherein the fourth means increase the braking forces according to a third rate schedule by which the applied braking forces are increased generally at a third rate according to a shortage of the applied braking forces relative to the target overall braking forces when the fifth means do not detect the vehicle running at said probability and according to a fourth rate schedule by which the applied braking forces are increased generally at a fourth rate generally smaller than the third rate according to a shortage of the applied braking forces relative to the target overall braking forces when the fifth means detect the vehicle running at said probability.

6. A moving behavior control device according to claim 5, wherein the fifth means detect the vehicle running at said probability when a lateral acceleration lager than a predetermined threshold value is acting at the vehicle.

7. A moving behavior control device according to claim 5, wherein the fifth means detect the vehicle running at said probability when the vehicle is yawing at a yaw rate lager than a predetermined threshold value.

8. A moving behavior control device according to claim 5, wherein the fifth means detect the vehicle running at said probability when a weighted sum of a lateral acceleration acting at the vehicle and a roll angular velocity of the vehicle body is lager than a predetermined threshold value.

9. A moving behavior control device according to claim 1, wherein the first rate schedule shows such a performance that the braking force decreasing rate is substantially constant at a first rate value against decrease of the excess of the applied braking forces relative to the target overall braking forces until the excess decreases down to a first excess value and then decreases substantially monotonously along with further decrease of the excess, while the second rate schedule shows such a performance that the braking force decreasing rate is substantially constant at a second rate value substantially smaller than the first rate value until the excess decreases down to a second excess value substantially smaller than the first excess value and then decreases substantially monotonously along with further decrease of the excess.

10. A moving behavior control device according to claim 5, wherein the third rate schedule shows such a performance that the braking force increasing rate increases substantially monotonously up to a third rate value along with increase of the shortage of the applied braking forces relative to the target overall braking forces until the shortage increases up to a first shortage value and then is substantially constant at the third rate value against further increase of the shortage, while the fourth rate schedule shows such a performance that the braking force increasing rate increases substantially monotonously up to a fourth rate value substantially smaller than the third rate value along with increase of the shortage of the applied braking forces relative to the target overall braking forces until the shortage increases up to a second shortage value and then is substantially constant at the fourth rate value against further increase of the shortage.

11. A moving behavior control device according to claim 1, wherein the first rate schedule shows such a performance that the braking force decreasing rate is substantially constant at a fifth rate value against decrease of the excess of the applied braking forces relative to the target overall braking forces until the excess decreases down to a third excess value and then decreases substantially monotonously at a first monotonously decreasing rate along with further decrease of the excess, while the second rate schedule shows such a performance that the braking force decreasing rate decreases substantially monotonously at a second monotonously decreasing rate substantially smaller than the first substantially monotonously decreasing rate down to a sixth rate value substantially smaller than the fifth rate value along with decrease of the excess of the applied braking forces relative to the target overall braking forces until the excess decreases down to a fourth excess value and then decreases substantially monotonously at a third monotonously decreasing rate substantially equal to the first monotonously decreasing rate along with further decrease of the excess.

12. A moving behavior control device according to claim 5, wherein the third rate schedule shows such a performance that the braking force increasing rate increases substantially monotonously at a first monotonously increasing rate up to a seventh rate value along with increase of the shortage of the applied braking forces relative to the target overall braking forces until the shortage increases up to a third shortage value and then is substantially constant at the seventh rate value against further increase of the shortage, while the fourth rate schedule shows such a performance that the braking force increasing rate increases substantially monotonously at a second monotonously increasing rate substantially equal to the first monotonously increasing rate up to an eighth rate value substantially smaller than the seventh rate value along with increase of the shortage of the applied braking forces relative to the target overall braking forces until the shortage increases up to a fourth shortage value substantially smaller than the third shortage value and then monotonously increases at a third monotonously increasing rate substantially smaller than the first monotonously increasing rate along with further increase of the shortage.

* * * * *